United States Patent [19]
Truesdell et al.

[11] Patent Number: 5,245,886
[45] Date of Patent: Sep. 21, 1993

[54] ROTARY TEMPERATURE MECHANISM

[75] Inventors: Robin L. Truesdell, Rossville; John W. Willis, Kokomo, both of Ind.; Clifton B. Ward, Rancho Viejo, Tex.; Timothy A. Gasaway, Kokomo, Ind.

[73] Assignee: Delco Electronics Corporation, Kokomo, Ind.

[21] Appl. No.: 930,253

[22] Filed: Aug. 14, 1992

[51] Int. Cl.⁵ .................. F16C 1/12; F16H 53/06
[52] U.S. Cl. ........................ 74/501.6; 74/500.5; 74/107; 74/89.2; 74/57; 74/569; 74/567; 74/527; 74/553
[58] Field of Search ................ 74/527, 553–556, 74/567, 568 R, 568 FS, 568 M, 568 T, 500.5, 501.5 R, 502, 502.1, 526, 531, 107, 89., 57

[56] References Cited

U.S. PATENT DOCUMENTS

| | | | |
|---|---|---|---|
| 3,059,482 | 10/1962 | Petzoldt | 74/53 |
| 3,396,938 | 8/1968 | Matsui | 251/229 |
| 4,012,966 | 3/1977 | Lieberman et al. | 74/531 X |
| 4,373,405 | 2/1983 | Geil | 74/553 X |
| 4,471,338 | 9/1984 | Holtkamp | 74/526 X |
| 4,561,565 | 12/1985 | Wolf et al. | 74/553 X |
| 4,653,343 | 3/1987 | Payen et al. | 74/568 T |
| 4,653,386 | 3/1987 | Hayakawa et al. | 98/40.28 |
| 4,699,018 | 10/1987 | Tagawa | 74/575 |
| 4,887,520 | 12/1989 | Bauer | 98/2 |
| 4,895,043 | 1/1990 | Lee | 74/527 |
| 4,934,397 | 6/1990 | Niemela et al. | 137/1 |
| 5,025,826 | 6/1991 | Schoepe et al. | 74/553 X |
| 5,055,643 | 10/1991 | Pardini et al. | 74/553 X |
| 5,121,653 | 6/1992 | Sigler | 74/553 |
| 5,129,283 | 7/1992 | Koehler | 74/527 X |

FOREIGN PATENT DOCUMENTS

| | | | |
|---|---|---|---|
| 1129388 | 5/1962 | Fed. Rep. of Germany . | |
| 3143672 | 5/1983 | Fed. Rep. of Germany | 11/36 |
| 2284924 | 5/1976 | France | 74/553 |
| 148132 | 9/1982 | Japan | 13/15 |
| 2188399 | 9/1987 | United Kingdom | 31/528 |

Primary Examiner—Vinh T. Luong
Attorney, Agent, or Firm—Patrick M. Griffin

[57] ABSTRACT

A rotary temperature mechanism for controlling the temperature door of a HVAC system of a vehicle includes a rotatable cam connected by a shaft to a rotary temperature control knob. The cam includes a helical rib thereon coacting with a carrier restricted to linear, sliding motion by the housing in response to rotation of the cam. The housing provides a linear track for guiding the carrier. Detent members are provided between the cam and housing to impart discrete stepping feel on rotation of the knob. The detent members include ball bearings on the cam rolling along a corrugated track of the housing. A cable is connected to the carrier and controls the temperature door by linear motion imparted thereon.

2 Claims, 2 Drawing Sheets

ROTARY TEMPERATURE MECHANISM

TECHNICAL FIELD

The invention relates a mechanism for translating rotary motion into linear motion, and more particularly to a rotary temperature mechanism controlling linear cable travel to drive a temperature door of a heating, ventilating and air conditioning system (HVAC) of a vehicle.

BACKGROUND OF THE INVENTION

Several present HVAC systems in Vehicles require rotary to linear motion air controller for controlling the temperature door thereof. Previous temperature controls have consisted of motor operated or purely linear drive mechanisms for driving the temperature door.

There have been known devices for translating rotary motion into linear motion for use in a vehicle valve control or ventilator. U.S. Pat. No. 4,653,386 issued Mar. 31, 1987 in the name of Hayakawa et al. discloses an adjusting mechanism for an air conditioner. The patent discloses a mechanism which uses a cable whose linear movement rotates a cam to move the side ventilator adjusting the direction of wind. In this case, drive motion is linear to rotary to linear to operate the ventilator.

U.S. Pat. No. 3,396,938 issued Aug. 13, 1968 in the name of Teruhiko Matsui discloses a valve actuating device which utilizes a manually actuated cylindrically shaped member having guide slots formed on its periphery. An internally threaded member extends through the guide slots and is prevented from rotating by guide portions located in the housing. The rotational movement of the threaded member will cause the cylindrically shaped member to rotate and move vertically linear. A valve is connected to the cylindrically shaped member by a valve stem.

SUMMARY OF THE INVENTION

The invention is a rotary control assembly for translating rotary motion from a manually operable knob on a temperature control panel into linear motion to control the movement of a drive cable. The assembly includes a housing and cam means having a cam perimeter responsive to rotary movement of the knob. The cam means includes a helical track about the cam perimeter. Carrier means is connected to the cable and is slidably driven by the track to reciprocate within the housing for providing linear movement to the cable and responsive to rotation of the cam member. The assembly also includes detent means operatively connected with the cam means and the housing for providing discrete stepping rotation of the knob and the cam means.

BRIEF DESCRIPTION OF THE DRAWINGS

Advantages of the invention will be readily appreciated from the following description when taken in conjunction with the accompanying drawings wherein.

DESCRIPTION OF THE PREFERRED EMBODIMENT

Figure 1:
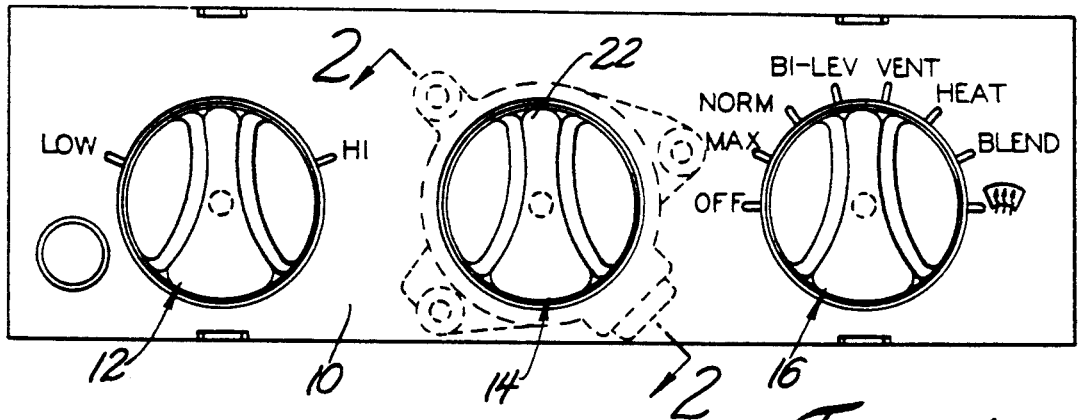
FIG. 1 is an elevational view of a temperature control panel of a vehicle using the subject invention.

An HVAC system of a vehicle generally has a temperature control panel 10 for setting the temperature of air passing into the passenger compartment the vehicle, as generally indicated in FIG. 1. The temperature control panel 10 includes a plurality of rotary switches including a fan switch 12, temperature switch 14 and a temperature mode switch 16. The fan switch 12 controls the velocity of the air forced into the passenger compartment of the vehicle, the temperature switch 14 sets the temperature of the air passing into the vehicle, and the temperature mode switch 16 sets the ventilation path and heating/cooling modes for the passenger compartment of the vehicle.

The temperature switch 14 is manually rotated by an operating knob whose rotary motion is translated into linear motion for driving the temperature door of a HVAC system in a vehicle.

Figure 2:
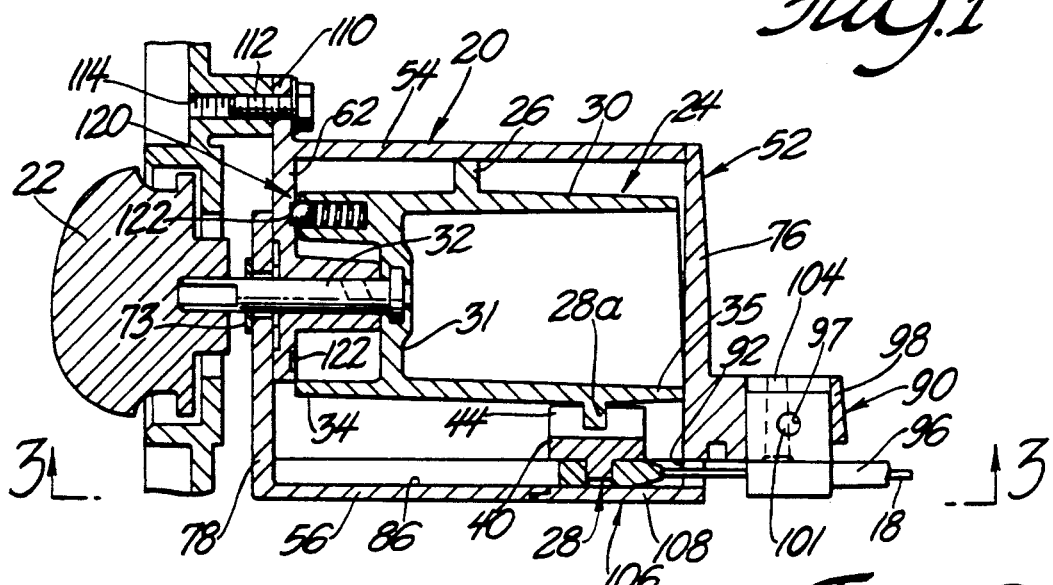
FIG. 2 is a cross-sectional view taken along lines 2—2 of FIG. 1 of the subject invention.
Figure 3:
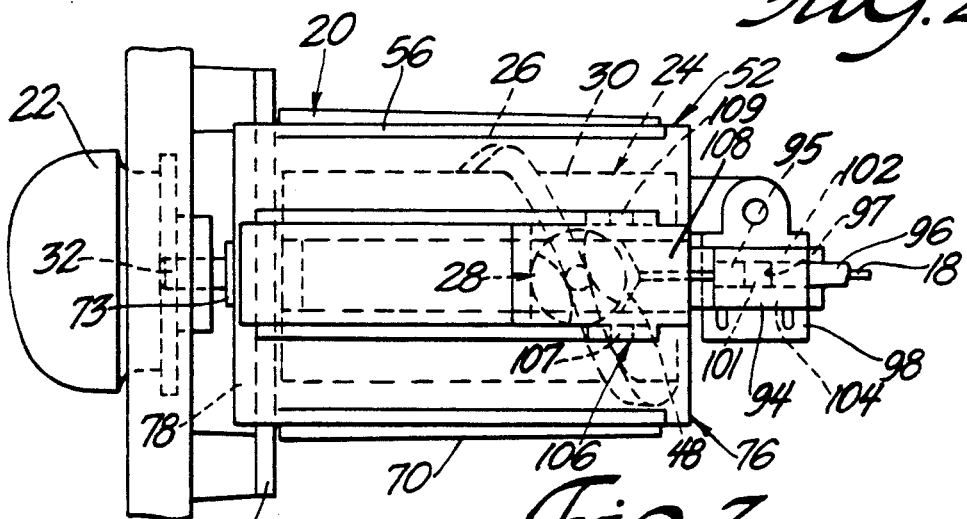
FIG. 3 is a top view looking in the direction of lines 3—3 of FIG. 2.
Figure 4:
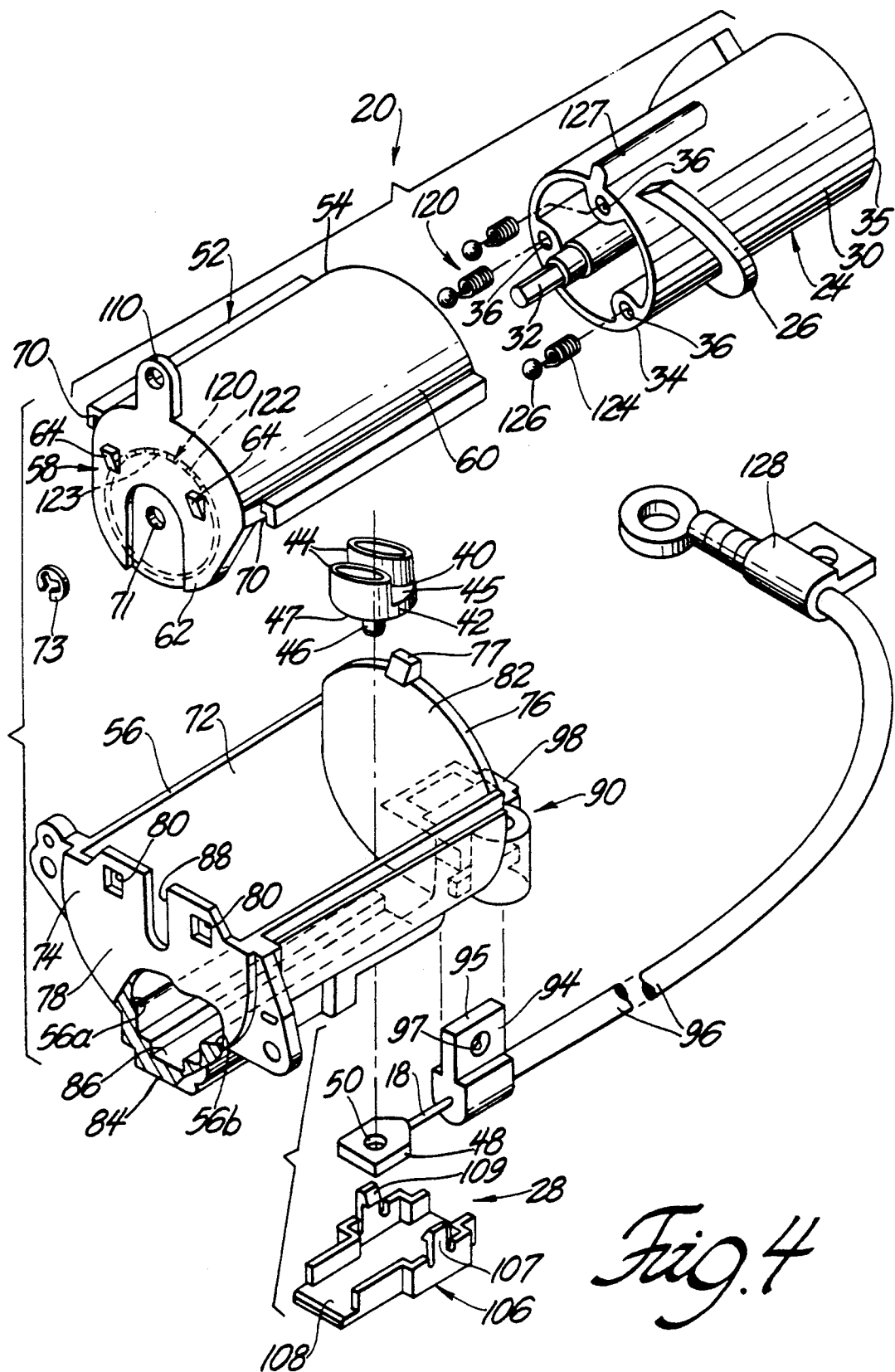
FIG. 4 is an exploded perspective view of the subject invention.

The temperature switch 14 includes a rotary control assembly 20 for translating rotary motion into linear motion to provide a linear output on a push-pull cable 18 as best illustrated in FIGS. 2-4. The rotary control assembly 20 may be used in a variety of applications where rotary motion is translated into linear motion, other than the application described herein.

In general, the rotary control assembly 20 includes a rotary knob 22 which is rotatably operated by the user of the vehicle. Rotational motion is imparted on the knob 22 to control the position of the temperature door of the HVAC system. Cam means 24 is operatively connected to the knob 22 for rotating directly in response to rotation of the knob 22. The cam means 24 includes a cam track 26 about the cam perimeter. The cam track 26 has a changing slope to provide a variable travel of the cable 18, as subsequently discussed. Carrier means 28 is connected to the cable 18 and slidably coacts with the track 26 for providing linear movement to the cable 18 in response to rotation of the cam means 24 by the knob 22. The carrier means 28 is slideably engaged by the cam track 26 to cause linear movement of the carrier means 28 in response to the rotation.

More particularly, the cam means 24 includes a cam 30 which is a generally cylindrically shaped tube. The cam 30 has a traverse plate 31 internally therein which is fixedly connected to a metal shaft 32, which is in turn fixedly connected to the knob 22. The metal shaft 32 is insert molded into the plate 31 of the cam 30 for optimum retention. The cam track 26 is designed as a solid rib on the cam perimeter to mate with and drive the carrier means 28. The cam 30 and track 26 are integral with one another and may be molded of plastic. The cam 30 includes first and second longitudinal ends 34, 35. The first longitudinal end 34 provides three pockets 36 (FIG. 4) longitudinally extending within the wall of the cam tube. The purpose of the pockets 36 will be subsequently discussed.

The carrier means 28 includes a generally U-shaped carrier 40. As best shown in FIG. 4, the U-shaped carrier 40 comprises a flat disk 42 having a pair of spaced oblong cylindrical arms 44 extending therefrom on a first side 45 thereof, and includes a pin 46 extending from a second side 47 thereof. The disk 42, arms 44 and pin 46 are integral with one another and are formed of molded rigid plastic. The carrier 40 is received by an eyelet member 48. The eyelet member 48 is generally a planar plate having an aperture 50 therethrough for receiving the pin 46 to secure the carrier 40 to the eyelet 48. The eyelet 48 is fixedly molded to the cable 18 so that the cable 18 is pushed or pulled in response to rotation of the cam 30 and the following linear motion of the carrier 40.

The assembly 20 also includes housing means 52 for housing and encapsulating the cam means 24 and carrier means 28 to secure same to the panel 10. The housing means 52 includes a cover member 54 and case member 56. The cover member 54 and case member 56 encompass the cam means 24 and are secure to one another by connecting means 58. The cover member 54 provides a generally semi-circular cover shell 60 with an abutting end face 62 secured at one end thereof. The end face 62 provides a pair of ramped or saw tooth projections 64 projecting therefrom for engagement with the case member 56, as subsequently discussed. The cover member 54 includes a pair of channels 70 formed along the longitudinal length thereof at the edges of the shell 60. The end face 62 also includes an aperture 71 for receiving the shaft 32 therethrough. A snap ring 73 is secured to the shaft 32 to retain the cam means 24 within the housing means 52.

The case member 56 includes a generally semi-circular case shell 72 having first and second ends 74, 76. The first end 74 includes a semi-circular end plate 78 attached thereto having a pair of notches 80 therein for mating and snapping with the projections 64. The second end 76 includes a circular plate 82 fixedly attached thereto for abutting against the cover shell 60 of the cover 54. A snap 77 is provided on the upper edge of the plate 82 to snap within a notch (not shown) of the cover 54. The longitudinal center line 84 of the case shell 72 includes, on its interior side, a stepped or recessed track 86 extending longitudinally therealong between the end plates 78 and 82 for receiving and guiding the sliding eyelet member 48 of the carrier means 28. The plate 78 includes a groove 88 therethrough to allow the shaft 32 to extend therein. The circular plate 82 includes an opening 92 therein for allowing the cable 18 to extend therethrough. The carrier 40 and eyelet 48 are fixedly received within the housing 52 with the cable 18 extending therefrom.

The cover 54 and case 56 mate to one another with the projections 64 extending and snapping into the notches 80 to secure the cover 54 to the case 56. The channels 70 receive the edges of the case shell 72.

The cam 30 includes a longitudinal ridge 127 radially extending therefrom between the ends of the helical track 26 to maintain the cam 30 rotatably centered within the cover 54 and case 56.

The circular plate 82 includes retainer means 90 extending outwardly therefrom. The retainer means 90 includes a cable flange member 94 attached to the cable insulation 96 about the cable 18. The cable flange member 94 includes a flange 95 extending therefrom with a notch 97 therethrough. The retainer means 90 includes a housing 98 extending from the circular end plate 82 for receiving the flange 95 of the cable flange member 94 therein between two parallel surfaces 102, 104, as best seen in FIG. 3. A snap 101 is provided on one surface 104 and aligned with the aperture 97 of the cable flag 94 such that the snap 101 is received in the notch 97 to secure the flag 94 to the housing 98. The retainer means 90 also includes a separate base member 106 which is snapped onto the case 56 by arms 107 having a tooth 109 extending inwardly to mate with notches in the case 56. A supplemental track 108 on the retainer means 90 abuts the stepped track 86 for providing an extension thereof. The retainer means 90 provides approximately one-third of the eyelet track, and is removable for servicing the cable 18.

The cover 54 includes an apertured flange 110 extending from the end thereof to abut against the panel 10 and receive a fastener 112 therethrough for securement to the panel 10. The fastener 112 is received within a bore 114 of the panel 10 to secure the housing to the panel 10. The knob 22 extends from the shaft or stem 32 to be accessible from the front of the cover panel 10.

The assembly 20 also includes detent means 120 operatively connected with the cam means 24 for providing discrete or incremental stepping rotation of the cam means 24. More particularly, the detent means 120 operatively interacts between the cam 30 and the end plate 62 of the cover 54. The interior surface of the end plate 62 includes a circular track 122 provided thereon having spaced corrugation or notches 123 formed therein, e.g., thirty-three notches. The diameter of the track 122 corresponds to the arcuate path of the pockets 36 during rotation of the cam 30. The pockets 36 of the cam 30 each receive a coil spring 124 and a ball bearing 126 therein. When the cam 30 is assembled to the cover 54, the springs 124 act against the pockets 36 to bias the balls 126 against the circular track 122. When the knob 22 and the cam 30 are rotated, the force of the spring biased balls 126 against the track 122 imparts a detenting or discrete stepping feel to the rotation of the knob 22.

The cable 18 is a bowden cable that is connected to a connector 128 coupled to the temperature door (not shown) of an HVAC system.

In operation, a user may rotate the knob 22 on the temperature control panel 10. Rotation of the knob 22 is directly imparted on the cam 30. Rotation of the knob 22 proceeds in a series of discrete steps due to the force of the balls 126 along the track 122. As the cam 30 rotates, the U-shaped carrier 40 slides with respect to the helical track 26 which is sloped so as to reciprocate the carrier in a linear motion with respect to the track 86. The case 56 provides stops 56a, 56b (FIG. 4) engageable with the ridge 127 for limiting rotation of the cam 30 at each end of a 270° travel. The carrier 40 is directly connected to the cable 18 and therefore pushes and pulls the cable depending on the linear movement thereof for adjusting the position of the temperature door.

It should be understood that linear travel ratio to rotation may be varied by changing the slope of the helical ridge 26, which also varies the torque thereon. A varying slope in the ridge 26 compensates for non-linearities in the HVAC system. The cam 30 and housings may be made of glass reinforced acetal with it being understood that other high strength plastics or metals are also suitable for these components or other components of the assembly 20.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A rotary control cable assembly for translating rotary movement into linear movement, said assembly comprising:

a cable, cam means having a cam perimeter and responsive to rotary movement, said cam means including a cam track helically connected about said cam perimeter;

carrier means connected to said cable and slidably coacting with said cam track for providing linear movement to said cable in response to rotation of said cam means;

detent means operatively connected with said cam means for providing discrete stepping rotation of said cam means; and said cam track including a helical rib projecting from said cam means having a variable slope for varying the linear movement in response thereto.

2. A rotary control cable assembly for translating rotary movement said assembly comprising:

a cable, cam means having a cam perimeter and responsive to rotary movement, said cam means including a cam track helically connected about said cam perimeter;

carrier means connected to said cable and slidably coacting with said cam track for providing linear movement to said cable in response to rotation of said cam means;

detent means operatively connected with said cam means for providing discrete stepping rotation of said cam means;

housing means for encapsulating said cam means, said housing means having a first and second end, said first end of said housing means including a circular track with a corrugated surface;

said cam means including at least one rounded member biased against said track for imparting a discrete stepping rotation to said cam means.

* * * * *